United States Patent
Finlay et al.

(12) 
(10) Patent No.: US 6,522,510 B1
(45) Date of Patent: Feb. 18, 2003

(54) GROUND FAULT CIRCUIT INTERRUPTER WITH MISWIRE PROTECTION AND INDICATOR

(75) Inventors: David A. Finlay, Marietta, NY (US); Thomas N. Packard, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 163 days.

(21) Appl. No.: 09/718,003

(22) Filed: Nov. 21, 2000

(51) Int. Cl.[7] .............................. H02H 3/16; H02H 3/26
(52) U.S. Cl. ........................... 361/42; 361/46; 361/93.1
(58) Field of Search ........................... 361/31, 42, 45, 361/54, 111, 46, 97; 335/18; 307/64; 340/649, 650

(56) References Cited

U.S. PATENT DOCUMENTS

| | | | |
|---|---|---|---|
| 4,618,907 A | 10/1986 | Leopold | 361/45 |
| 5,363,269 A | 11/1994 | McDonald | 361/45 |
| 5,638,243 A | 6/1997 | Torezan et al. | 361/42 |
| 6,262,871 B1 * | 7/2001 | Nemir et al. | 324/424 |

\* cited by examiner

Primary Examiner—Stephen W. Jackson
Assistant Examiner—Boris Benenson
(74) Attorney, Agent, or Firm—Wall Marjama & Bilinski LLP

(57) ABSTRACT

An AC power line protection device includes a resistive element connected at one end to a hot power conductor and at another end to either a breaker coil operatively associated with a set of interrupting contacts or to a gate or base for a switch element. When AC power is miswired to the load terminals, the device trips the contacts due to the presence of the resistive element. The device does not work properly until AC power is connected to the line terminals, at which time the resistive element clears itself from the circuit. An indicator lamp lights when the device is in the tripped condition and turns off when the device is reset. If the device is miswired after having been wired properly, i.e., the resistive element has cleared, the indicator lamp does not light when the device is tripped, and so provides a supplemental indication of miswiring.

37 Claims, 4 Drawing Sheets

GROUND FAULT CIRCUIT INTERRUPTER WITH MISWIRE PROTECTION AND INDICATOR

FIELD OF THE INVENTION

This invention pertains to the field of ground fault circuit interrupter devices, and in particular, to a ground fault interrupter device with miswire protection and indicator functions.

BACKGROUND OF THE INVENTION

Ground fault circuit interrupters (GFCIs) are well known in the art. Their intent is and always has been to protect the electrical power user from electrocution when hazardous ground fault currents are present.

Historical problems with these devices include the possibility of line/load miswiring in the field by an installer or the eventual failure of the solenoid driving device, typically a silicon controlled rectifier, which causes the interrupter device to become inoperable while electrical power is still present, even under hazardous ground fault conditions. A variety of methods are used to prevent or attempt to prevent miswiring with varying levels of success. Preventing the problems associated with a defective solenoid driving device is inherently more difficult. Labels and installation instruction sheets have been used to prevent miswiring, but can be ignored by the installer. Solenoid burn-out has been revealed by testing the protective device with a test button, but the result of the test can be ignored by the user.

SUMMARY OF THE INVENTION

Briefly stated, an AC power line protection device such includes a resistive element connected at one end to a hot power conductor, and connected at another end to either a breaker coil operatively associated with a set of interrupting contacts or to a gate or base for a switch element. When AC power is miswired to the load terminals, the power interrupting contacts of the device trip due to the presence of the resistive element. The device does not work properly until AC power is connected to the line terminals, at which time the resistance element clears itself from the circuit. A testing switch permits testing the device after manufacturing without clearing the resistive element. An indicator lamp lights when the device is in the tripped condition and turns off when the device is reset. If the device is miswired after having been wired properly, i.e., the resistance element has cleared, the indicator lamp does not light when the device is tripped, and so provides a supplemental indication of miswiring.

According to an embodiment of the invention, a protection device connected between hot and neutral conductors of an AC power line includes a fault detection circuit including a breaker coil operatively associated with a set of contacts; at least one resistive element connected at one end to the hot conductor; wherein connecting AC power to load terminals of the protection device trips the contacts; and wherein connecting AC power to line terminals of the protection device permanently clears the at least one resistive element.

According to an embodiment of the invention, a protection device connected between hot and neutral conductors of an AC power line includes a fault detection circuit including a breaker coil operatively associated with a set of contacts; the set of contacts including hot conductor contacts and neutral conductor contacts; and an indicator lamp circuit including an indicator lamp wherein, when the protection device is properly wired to the AC power line, the indicator lamp lights when the interrupting contacts are opened by the protection device and the indicator lamp goes out when the protection device is reset and the interrupting contacts close.

According to an embodiment of the invention, a method of protecting against miswiring a protection device, wherein the protection device is connectable between AC power conductors includes the steps of providing a resistive element in the protection device such that the protection device trips out when miswired to the AC power conductors, and clearing the resistive element when the protection device is properly wired to the AC power conductors.

According to an embodiment of the invention, a method of protecting against miswiring a protection device, wherein the protection device is connectable to an AC power source includes the steps of providing an impedance in the protection device which prevents a set of contacts from closing if the protection device is improperly connected to an AC power source, and clearing the impedance when the protection device is properly wired to the AC power source.

According to an embodiment of the invention, a protection device connected between hot and neutral conductors of an AC power line includes first circuit means for preventing electrical contacts in the device from closing when the device is improperly connected to a source of AC power, and second circuit means for permitting the contacts to close when the device is properly connected to the source of AC power.

According to an embodiment of the invention, a protection device connected between hot and neutral conductors of an AC power line, wherein the device includes an interrupter having two contacts connected respectively to line hot and load hot terminals and two contacts connected respectively to line neutral and load neutral terminals, wherein the interrupter opens and closes to electrically disconnect and connect the load hot terminals, respectively, the device includes a resistor connected across the load hot and the line neutral terminals, and an indicator connected across the line hot and the load hot terminals, wherein the indicator indicates if a power source is connected across the line hot and line neutral terminals while the contacts are open.

According to an embodiment of the invention, a method for protecting against miswiring a protection device includes the steps of (a) preventing electrical contacts in the device from closing when the device is improperly connected to a source of AC power, and (b) permitting the contacts to close when the device is properly connected to the source of AC power.

According to an embodiment of the invention, a method for protecting against miswiring a protection device connected between hot and neutral conductors of an AC power line, wherein the device includes an interrupter having two contacts connected respectively to line hot and load hot terminals and two contacts connected respectively to line neutral and load neutral terminals, wherein the interrupter opens and closes to electrically disconnect and connect the load hot terminals, respectively, includes the steps of connecting a resistor across the load hot and the line neutral terminals, and connecting an indicator across the line hot and the load hot terminals, wherein the indicator indicates if a power source is connected across the line hot and line neutral terminals while the contacts are open.

According to an embodiment of the invention, a method for protecting against miswiring a protection device connected between hot and neutral conductors of an AC power line, wherein the device includes an interrupter having two contacts connected respectively to line hot and load hot terminals and two contacts connected respectively to line neutral and load neutral terminals, wherein the interrupter opens and closes to electrically disconnect and connect the load hot terminals, respectively, includes the steps of connecting a resistor across the load hot and the line neutral terminals, and connecting an indicator across the line neutral and load neutral terminals, wherein the indicator indicates if a power source is connected across the line hot and line neutral terminals while the contacts are open.

According to an embodiment of the invention, a protection device connected between hot and neutral conductors of an AC power line includes a protective circuit operatively associated with a set of interrupting contacts through a switch element; the set of interrupting contacts including a hot conductor contact and a neutral conductor contact; an indicator lamp circuit including an indicator lamp wherein, when the protection device is properly wired to the AC power line, the indicator lamp lights when the interrupting contacts are opened by the protection device and the indicator lamp goes out when the protection device is reset and the interrupting contacts close; the indicator lamp being in parallel with the hot conductor contact; and a resistor connected between the indicator lamp and the switch element, wherein the indicator lamp lights when the switch element is shorted.

DETAILED DESCRIPTION OF THE PREFERRED EMBODIMENT

Figure 1:
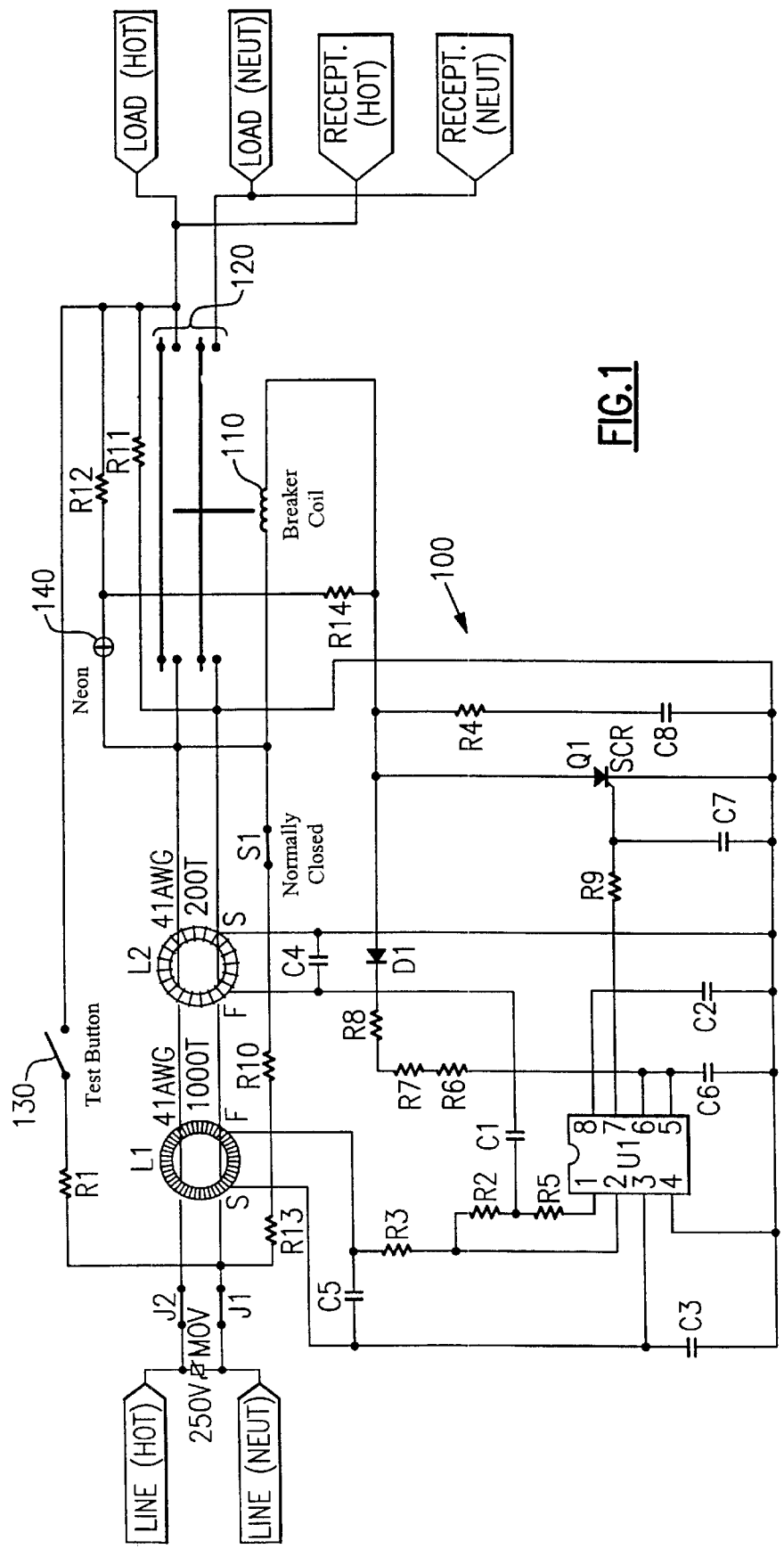
FIG. 1 shows a schematic of a GFCI circuit with miswire protection and an indicator lamp according to an embodiment of the invention.

Referring to FIG. 1, a GFCI circuit is shown generally at 100. When a differential transformer L1 senses unequal amounts of current flowing in the hot and neutral conductors due to a ground fault condition, circuit 100 causes a breaker coil 110 to activate, opening circuit interrupting mechanism 120. Circuit interrupting mechanism 120 conventionally includes hot and neutral bus bars that make and break contact with the hot and neutral power lines, respectively, via contacts located on both the bus bars and power lines at the four contact points. A test button 130 induces a simulated ground fault when pushed in and causes breaker coil 110 to activate.

This improved GFCI contains two unique features that address the problems noted in the background section. The first is a miswire circuit which uses a fault resistance R10, R13 creating a differential current on the primary of the differential current transformer L1 that exceeds the level of differential current that the GFCI has been designed to interrupt, typically 6 milliamperes. The fault resistance R10, R13 is on the line side of interrupting contacts 120 electrically located between the line and load terminals of the hot and neutral wire paths. The ground fault circuit sensing electronics of GFCI circuit 100 derives power from the line side terminals of the GFCI.

Should the GFCI be wired in a mode where power is supplied to the load terminals, i.e., miswired, if the GFCI is tripped, nothing visible happens. If the GFCI is in the reset condition, it will immediately trip when powered. In this mode, the current flowing through the fault resistance R10, R13, derived from the line terminal side of the device, is interrupted when the device trips. The estimated time it takes for the fault resistors R10, R13 to "clear" or burn out is greater than 50 ms. Because the trip time of the GFCI is less than or equal to 25 ms, fault resistors R10, R13 do not have enough time to clear. If one attempts to reset the device when in the miswired condition, the device immediately trips out again, and this continues until such time as the device is wired correctly, that is, when power is applied to the GFCI at the line terminals. This effectively results in a GFCI that will not operate, i.e., be able to be reset, until such time as the device is properly wired.

When electrical power is connected in a correct manner to the line terminals, a differential current is created by the fault resistance R10, R13 when power is applied to the device. If the device is reset before power is applied, the device trips as a result of this differential current. If the device is already in the tripped condition before power is applied, nothing visible happens. However, because the fault resistor is on the line side of the interrupting contacts 120, current through fault resistance R10, R13 continues to flow, regardless of interrupting contacts 120 being open. This internal differential current, created by the fault resistance R10, R13 clears itself in a short time, typically 50 ms. This can be accomplished by selecting a resistor or resistors whose power rating is greatly exceeded by the current, such that the resistor or resistors open. Another option is to provide a fuse (F1 in FIG. 3) in series with the fault resistance R10, R13 with a properly selected $I^2t$ rating so that the fuse blows instead of the fault resistance R10, R13. Once the device has been properly wired with power connected to the line terminals and the fault has been cleared, the device can be reset and provide its normal protective functions.

Two interesting issues with this miswire protection concept are how to perform the Underwriters Laboratories required tests, such UL943, during manufacturing of the protective device without the differential current produced by the fault resistor affecting the test results, or causing the fault resistor to clear in the manner previously described. A solution is to place a normally closed switch S1 in series with the fault resistance R10, R13 previously described as producing the differential current. This switch S1 is preferably a flexible conductive spring arm that normally rests against a contact on the top side of the printed circuit board. Directly below the spring arm of switch S1 is a hole in the printed circuit board, and below this hole is another hole in the plastic back body of the GFCI device. When the GFCI is loaded into a piece of test equipment designed to perform the required manufacturing tests, a mechanical test probe engages the spring arm of switch S1 through the two aforementioned holes, causing the spring arm of switch S1 to be pushed away from the contact and therefore opening the differential current circuit path. Manufacturing testing can now be performed without any circuit effect from this path, without burning out fault resistance R10, R13. The last test performed on the GFCI device in the test sequence is to disengage the probe from the spring arm of switch S1, followed by connecting the differential current circuit path and causing the GFCI device to trip, thereby checking the integrity of the differential current circuit path and components.

The second feature of this improved GFCI is a light with multiple indication meanings. The circuit in FIG. 1 includes resistors R11, R12, R14, and an indication device, shown on the schematic as neon light 140. The first function of light 140 is as a trip indicator. The light is off if the GFCI is in the reset condition, and illuminates if the GFCI trips. The second function of light 140 is to indicate miswiring. A third function of light 140 is to notify the user that the solenoid-driving device is defective and that the GFCI is no longer operational.

The indicating circuit works as follows. When the GFCI is wired properly, i.e., power from the supply source is connected to the line terminals and not the load terminals, and the device is reset, light 140 is off, as the line disconnecting contacts 120 are closed, resulting in no voltage across light 140 and resistor R12. If the GFCI trips for any reason, light 140 energizes as a result of line voltage being applied across light 140 and resistors R12 and R11. When the device is reset, voltage is removed and light 140 turns off. If the device is miswired for any reason, light 140 is off when the GFCI is reset, but when the device trips in this condition, there is no return path to neutral through resistor R11, and light 140 does not turn on as it would if the GFCI were wired properly. This feature is not dependent on the fault resistance R10, R13; therefore, if the miswire detection circuit has been previously used and the fault resistance cleared, miswire detection is still possible by exercising this light in conjunction with tripping out the GFCI.

Indicating a defective solenoid driving device, such as SCR Q1, is achieved with the addition of a resistor R14. With resistor R14 in the circuit, light 140 energizes when the SCR Q1 short circuits and a path to supply neutral develops. When this occurs, and the device is reset, the GFCI trips, energizing light 140 through resistor R14. Continuously applied line voltage to the solenoid occurring as a result of a shorted SCR Q1 causes the trip solenoid (coil 110) to open within a few seconds. Coil 110 burns out since it is continuously energized, so it cannot trip again after the device is reset. When the GFCI is reset in this condition, light 140 remains energized, indicating a defective solenoid driving device. The value of resistor R14 must be kept low relative to the value of resistor R12 as a voltage divider occurs between resistors R12 and R14 which limits the voltage across light 140. A neon lamp needs a minimum of about 60 volts to arc over and energize. A value of 33K for resistor R14 is suitable for this embodiment, which provides for about 66 volts across the neon lamp at a worst case line voltage of 102 VAC. Computing different values for resistors R11, R12, and R14 based on different types of lights 140 is considered within the capabilities of one skilled in the art.

Figure 2:
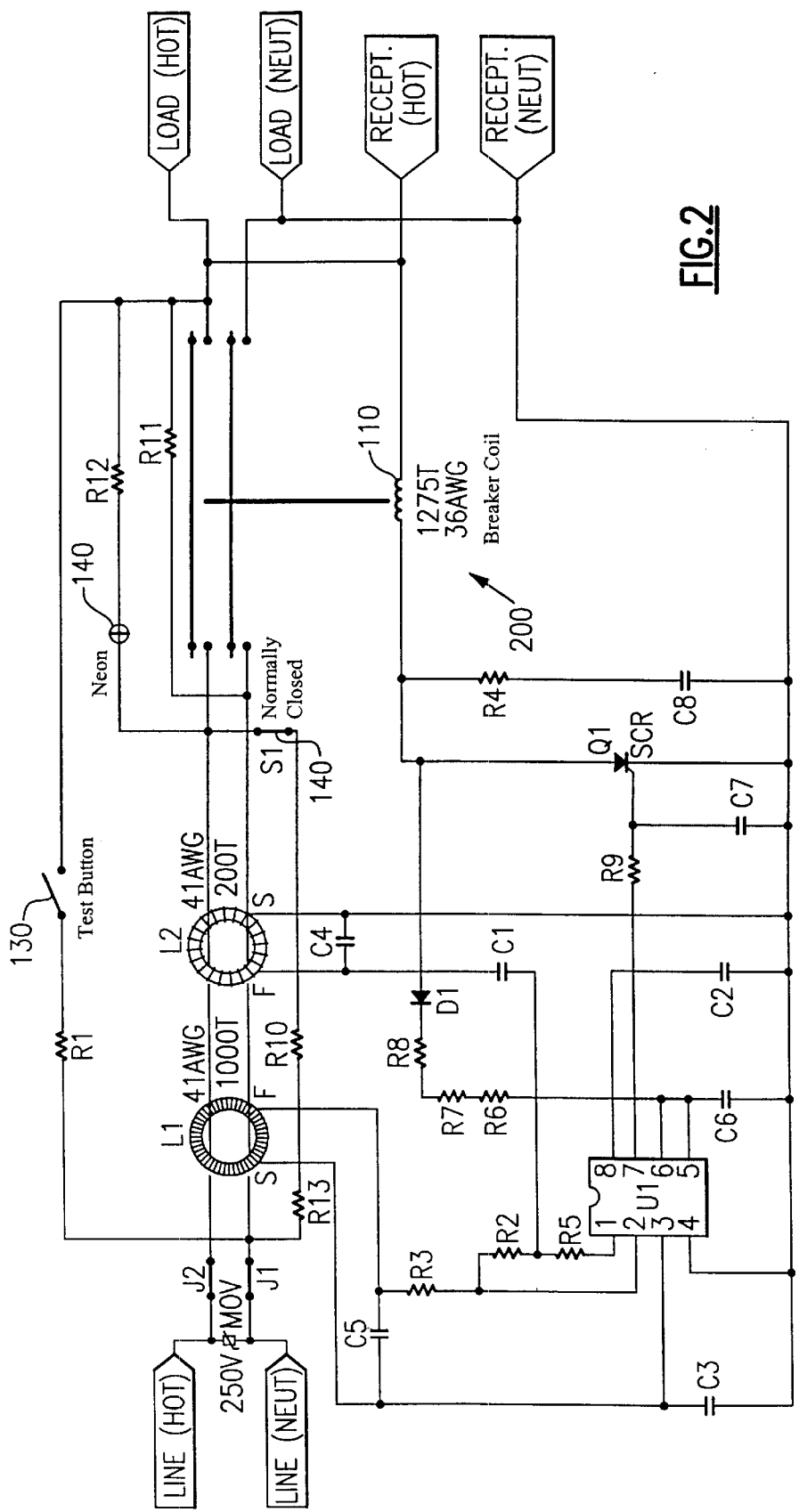
FIG. 2 shows a schematic of a lockout configuration according to an embodiment of the invention.

Referring to FIG. 2, an embodiment of the invention is shown at 200 in which the protection device cannot be reset if the SCR shorts out, i.e., the device is "locked out." This is because breaker coil 110 draws its power from the load sides of contacts 120 instead of the line side as in the embodiment of FIG. 1. When the SCR shorts out, breaker coil 110 immediately trips and opens contacts 120. Opening contacts 120 breaks the current to the load side of the device, so breaker coil 110 is de-energized, preventing it from burning out. When attempting to reset the device, breaker coil 110 immediately trips out contacts 120, thus preventing the device from being reset. Since the device cannot be reset, resistor R14 is not used in this embodiment because there is no need to indicate via light 140 that the device has a faulty SCR; the inability to reset the device signals that condition.

Figure 3:
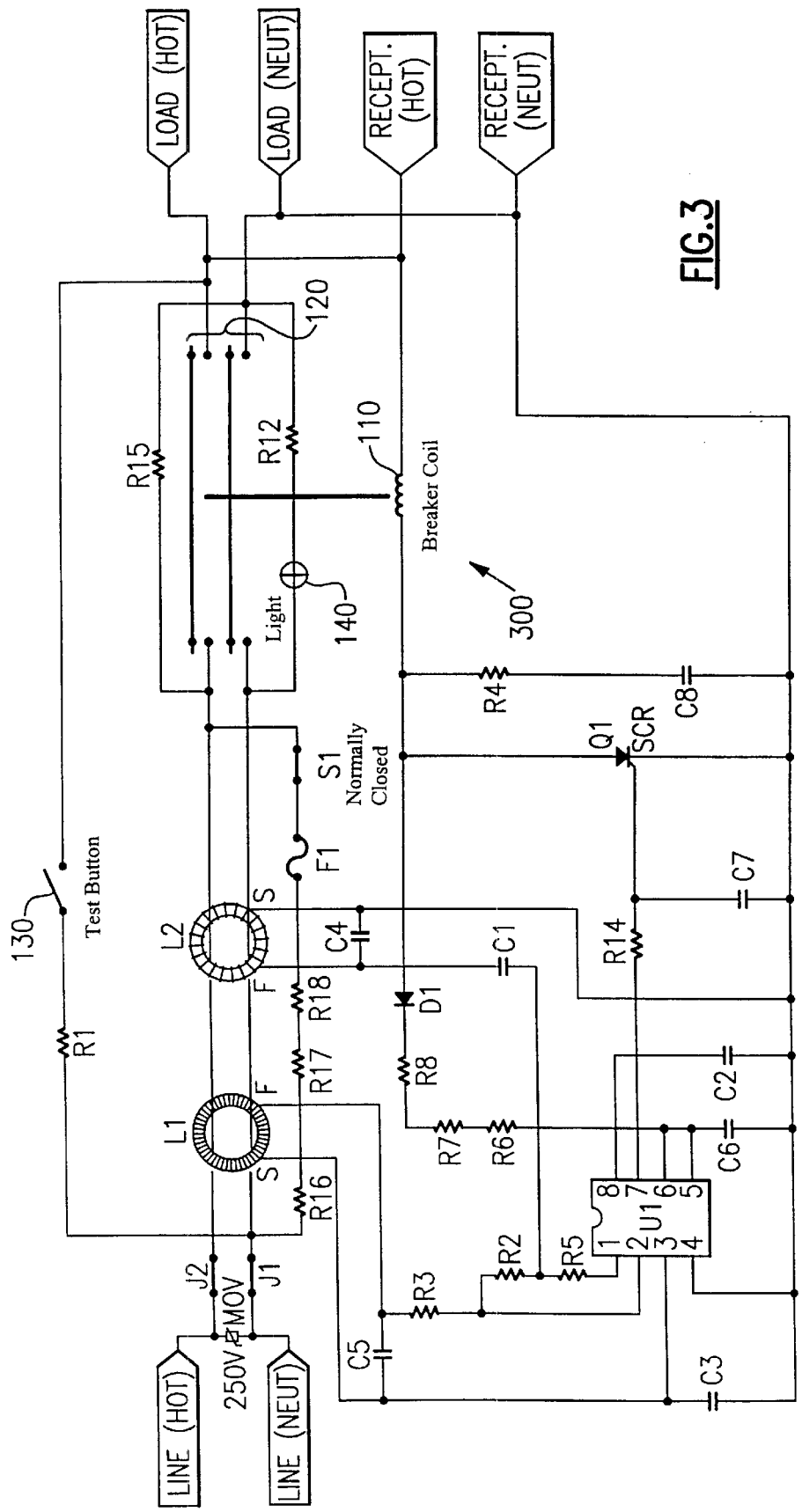
FIG. 3 shows a schematic of an alternative lockout configuration according to an embodiment of the invention.

Referring to FIG. 3, an alternative lock-out embodiment is shown at 300 which shows the series combination of light 140 and resistor R12 connected in parallel to the neutral conductor contact instead of the hot conductor contact as is the case in FIGS. 1 and 2. A resistor R15 completes the light circuit from load neutral to line hot. The fault resistance is shown here as resistors R16, R17, and R18 in series with fuse F1. This embodiment eliminates any trickle current that might be flowing if the device is miswired.

Figure 4:
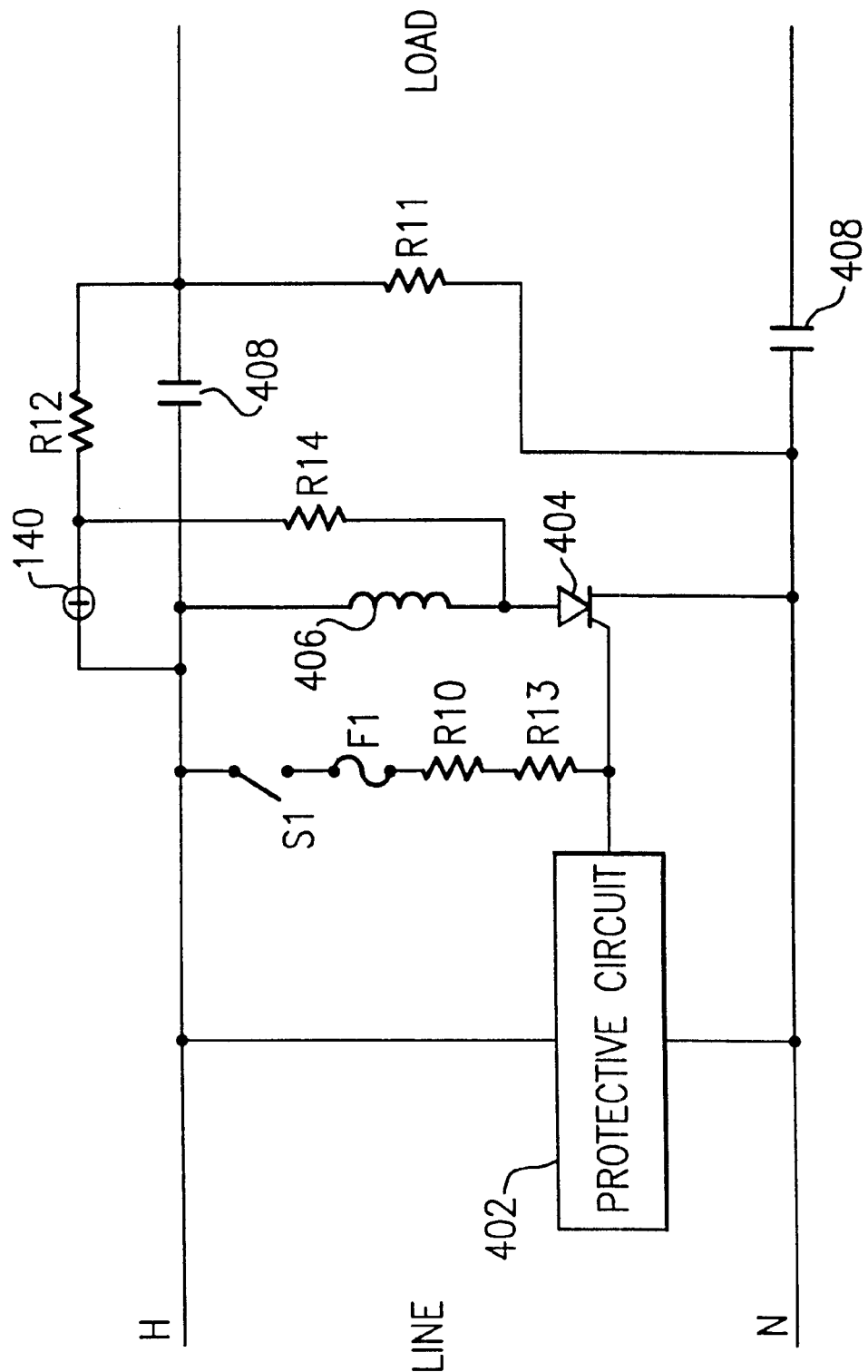
FIG. 4 shows a schematic of a protective circuit with miswire protection and an indicator lamp according to an embodiment of the invention.

Referring to FIG. 4, an embodiment of the invention is shown at 400 in which the protection device can be reset if the SCR shorts out. The embodiment is similar to the one shown in FIG. 1 except that it is generalized to apply to different protective devices such as ground fault circuit interrupters (GFCI's) or devices intended to interrupt ground faults from personnel contact with a power line conductor, arc fault circuit interrupters (AFCI's) intended to interrupt line current which if allowed to continue could cause an electrical fire, combination devices that provide both AFCI and GFCI protection, or the like.

According to this embodiment, the protective devices mentioned have a protective circuit 402 that detects the respective fault condition, turning on an electronic switching device such as SCR 404, energizing a solenoid 406 coil which receives power from the line conductors, to open interrupting contacts 408. Resistors R11, R12, R14, fault resistors R10, R13, normally closed switch S1, fuse F1, and light 140 have the same functions as previously described in the above embodiments. When power is miswired to the load terminals and the protective device is reset such that interrupting contacts 408 are closed, current flows through normally closed switch S1, fuse F1, fault resistors R10, R13 and the gate-cathode junction of SCR 404, energizing solenoid 406 and tripping the interrupting contacts 408. Fuse F1 and fault resistors R10, R13 are chosen to withstand the current flow for the time that power is applied to the load terminals to the moment when interrupting contacts 408 open, approximately 25 milliseconds. If line power is connected as intended to the line terminals of the protective device, current flows through normally closed switch S1, fuse F1, fault resistors R10, R13, and the gate cathode junction of SCR 404 until such time as fuse F1 clears, after which it is possible to accomplish a resetting of the interrupting contacts 408. Solenoid 406 is designed not to burn out during the interval that SCR 404 is conductive, which interval is designed to be approximately 100 milliseconds. In this manner the protective functions described in FIG. 1 are provided without necessarily requiring a differential current transformer L1 in the construction of the protective device nor attachment of the fault resistor and fuse circuit to both the hot and neutral line conductors. If an electronic switching device other than an SCR is used, e.g., a bipolar transistor, the connections shown here as being made to the gate of the SCR would instead be made to the base of the bipolar transistor. "Gate" and "base" are intended to have an equivalent meaning in this specification and claims.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A protection device connected between hot and neutral conductors of an AC power line, comprising:
   a fault detection circuit including a breaker coil operatively associated with a set of contacts; wherein one end of said breaker coil is connected to said hot conductor and another end of said breaker coil is connected to said neutral conductor via a switch;

at least one resistive element connected at one end to a line side of said hot conductor and at another end to a line side of said neutral conductor;

wherein connecting AC power to load terminals of said protection device opens said contacts; and wherein connecting AC power to line terminals of said protection device permanently clears said at least one resistive element.

2. A protection device connected between hot and neutral conductors of an AC power line, comprising:

a fault detection circuit including a breaker coil operatively associated with a set of contacts; wherein one end of said breaker coil is connected to said hot conductor and another end of said breaker coil is connected to said neutral conductor via a switch element;

at least one resistive element connected at one end to said hot line conductor and connected at another end to a gate of said switch element;

wherein connecting AC power to load terminals of said protection device opens said contacts; and wherein connecting AC power to line terminals of said protection device permanently clears said at least one resistive element.

3. A device according to claim 2 wherein said set of contacts includes hot conductor contacts and neutral conductor contacts, further comprising:

an indicator lamp and a first resistor connected in parallel with said hot conductor contacts; and a second resistor connected in series from said hot conductor on a load side of said hot conductor contacts to said neutral conductor on a line side of said neutral conductor contacts.

4. A device according to claim 3, further comprising a third resistor connected at one end between said indicator lamp and said first resistor and at another end between said breaker coil and said switch element, wherein said indicator lamp lights when said switch element is shorted.

5. A device according to claim 1, wherein said at least one resistive element is only one resistor.

6. A device according to claim 1, wherein said at least one resistive element includes at least two resistors in series.

7. A device according to claim 1, wherein said at least one resistive element includes a fuse in series with a resistor.

8. A device according to claim 1, further comprising a normally closed switch in series with said at least one resistive element, such that when said switch is open, testing of said protection device is enabled without permanently clearing said at least one resistive element.

9. A device according to claim 1 wherein said set of contacts includes hot conductor contacts and neutral conductor contacts, further comprising:

an indicator lamp and a first resistor connected in parallel with said hot conductor contacts; and a second resistor connected in series from said hot conductor on a load side of said hot conductor contacts to said neutral conductor on a line side of said neutral conductor contacts.

10. A device according to claim 9, further comprising:

said fault detection circuit including a switch element connected to one end of said breaker coil; and a third resistor connected at one end between said indicator lamp and said first resistor and at another end between said breaker coil and said switch element, wherein said indicator lamp lights when said switch element is shorted.

11. A device according to claim 1, wherein said breaker coil is powered on one side through a switch element to said neutral conductor on a line side of said contacts, and on another side directly to said hot conductor on a line side of said contacts.

12. A device according to claim 1, wherein said breaker coil is powered on one side through a switch element to said neutral conductor on a load side of said contacts, and on another side directly to said hot conductor on a load side of said contacts.

13. A protection device connected between hot and neutral conductors of an AC power line, comprising:

a fault detection circuit including a breaker coil operatively associated with a set of interrupting contacts;

said fault detection circuit including circuitry which opens said interrupting contacts if said protection device is miswired to said AC power line before being wired properly;

said set of interrupting contacts including hot conductor contacts and neutral conductor contacts; and an indicator lamp circuit including an indicator lamp wherein, when said protection device is properly wired to said AC power line, said indicator lamp lights when said interrupting contacts are opened by said protection device and said indicator lamp goes out when said protection device is reset and said interrupting contacts close.

14. A protection device according to claim 13, wherein said indicator lamp circuit includes:

said indicator lamp and a first resistor connected in parallel with said hot conductor contacts; and a second resistor connected from said hot conductor on a load side of said hot conductor contacts to said neutral conductor on a line side of said neutral conductor contacts.

15. A protection device according to claim 14, wherein said indicator lamp does not light when said interrupting contacts are opened by said protection device if said protection device is miswired even after having been properly wired to said AC power line.

16. A protection device according to claim 13, wherein said indicator lamp circuit includes:

said indicator lamp and a first resistor connected in parallel with said neutral conductor contact; and a second resistor connected from said neutral conductor on a load side of said neutral conductor contact to said hot conductor on a line side of said hot conductor contact.

17. A protection device according to claim 16, wherein said indicator lamp does not light when said interrupting contacts are opened by said protection device if said protection device is miswired even after having been properly wired to said AC power line.

18. A protection device according to claim 16, further comprising:

a switch element in said fault detection circuit connected to one end of said breaker coil;

another end of said breaker coil being connected to said hot conductor; and a third resistor connected at one end between said indicator lamp and said first resistor and at another end between said breaker coil and said switch element, wherein said indicator lamp lights when said switch element is shorted.

19. A protection device according to claim 13, wherein said indicator lamp does not light when said interrupting contacts are opened by said protection device if said protection device is miswired even after having been properly wired to said AC power line.

20. A method of protecting against miswiring a protection device, wherein said protection device is connectable between AC power conductors, comprising the steps of:
   providing a resistive element in said protection device such that said protection device trips out when miswired to said AC power conductors; and
   clearing said resistive element when said protection device is properly wired to said AC power conductors.

21. A method according to claim 20, further comprising placing a normally closed switch in series with said resistive element so that testing of said protection device after manufacturing and before being connected to said AC power conductors does not clear said resistive element.

22. A method according to claim 20, further comprising providing an indicator lamp in said protection device such that said lamp lights when said protection device trips and turns off when said protection device is reset.

23. A method according to claim 22, wherein after said resistive element is cleared and said protection device is subsequently miswired, said indicator lamp does not light when said protection device trips.

24. A method according to claim 22, wherein said indicator lamp lights if a switching element in a fault detection circuit in said protection device is shorted.

25. A method according to claim 20, further comprising the step of placing a light in parallel with one set of normally closed contacts such that said light is off when said contacts are closed and said light is on when said contacts are open, irrespective of whether a load is connected to said light.

26. A method according to claim 20, further comprising the step of placing a light in parallel with one set of normally closed contacts such that when power is properly connected to said protection device, said light is off when said contacts are closed and said light is on when said contacts are open, but when power is improperly connected to said protection device, said light is off when said contacts are closed and said light is off when said contacts are open, irrespective of whether a load is connected to said light.

27. A method according to claim 20, further comprising the step of locking out a trip mechanism in said protection device such that when a switch element in said protection device shorts out, said trip mechanism cannot be reset.

28. A method of protecting against miswiring a protection device, wherein said protection device is connectable to an AC power source, comprising the steps of:
   providing an impedance in said protection device which prevents a set of contacts from closing if said protection device is improperly connected to an AC power source; and
   clearing said impedance when said protection device is properly wired to said AC power source.

29. A method according to claim 28, wherein said impedance device is a fuse.

30. A protection device connected between hot and neutral conductors of an AC power line, comprising:
   first circuit means for preventing electrical contacts in said device from closing when said device is improperly connected to a source of AC power; and
   second circuit means for permitting said contacts to close when said device is properly connected to said source of AC power.

31. A device according to claim 30, wherein said second circuit means disables said first circuit means when said device is properly connected to said source of AC power.

32. A protection device connected between hot and neutral conductors of an AC power line, wherein said device includes an interrupter having two contacts connected respectively to line hot and load hot terminals and two contacts connected respectively to line neutral and load neutral terminals, wherein said interrupter opens and closes to electrically disconnect and connect said load hot terminals, respectively, said device comprising:
   circuitry which opens said interrupting contacts if said protection device is miswired to said AC power line before being wired properly;
   a resistor connected across said load hot and said line neutral terminals; and
   an indicator connected across said line hot and said load hot terminals, wherein said indicator indicates if a power source is connected across said line hot and line neutral terminals while said contacts are open.

33. A method for protecting against miswiring a protection device, comprising the steps of:
   (a) preventing electrical contacts in said device from closing when said device is improperly connected to a source of AC power; and
   (b) permitting said contacts to close when said device is properly connected to said source of AC power.

34. A method according to claim 33, further comprising the step of disabling step (a) when said device is properly connected to said source of AC power.

35. A method for protecting against miswiring a protection device connected between hot and neutral conductors of an AC power line, wherein said device includes an interrupter having two contacts connected respectively to line hot and load hot terminals and two contacts connected respectively to line neutral and load neutral terminals, wherein said interrupter opens and closes to electrically disconnect and connect said load hot terminals, respectively, comprising the steps of:
   preventing said contacts from closing when said device is improperly connected to a power source;
   permitting said contacts to close when said device is properly connected to said power source;
   connecting a resistor across said load hot and said line neutral terminals; and
   connecting an indicator across said line hot and said load hot terminals, wherein said indicator indicates if said power source is connected across said line hot and line neutral terminals while said contacts are open.

36. A method for protecting against miswiring a protection device connected between hot and neutral conductors of an AC power line, wherein said device includes an interrupter having two contacts connected respectively to line hot and load hot terminals and two contacts connected respectively to line neutral and load neutral terminals, wherein said interrupter opens and closes to electrically disconnect and connect said load hot terminals, respectively, comprising the steps of:
   preventing said contacts from closing when said device is improperly connected to a power source;
   permitting said contacts to close when said device is properly connected to said power source;
   connecting a resistor across said load hot and said line neutral terminals; and
   connecting an indicator across said line neutral and load neutral terminals, wherein said indicator indicates if said power source is connected across said line hot and line neutral terminals while said contacts are open.

37. A protection device connected between hot and neutral conductors of an AC power line, comprising:
   a protective circuit operatively associated with a set of interrupting contacts through a switch element;
   said set of interrupting contacts including a hot conductor contact and a neutral conductor contact;
   circuitry which opens said interrupting contacts if said protection device is miswired to said AC power line before being wired properly;
   an indicator lamp circuit including an indicator lamp wherein, when said protection device is properly wired to said AC power line, said indicator lamp lights when said interrupting contacts are opened by said protection device and said indicator lamp goes out when said protection device is reset and said interrupting contacts close;

said indicator lamp being in parallel with said hot conductor contact; and a resistor connected between said indicator lamp and said switch element, wherein said indicator lamp lights when said switch element is shorted.

* * * * *